US011702518B2

(12) United States Patent
Nosker et al.

(10) Patent No.: US 11,702,518 B2
(45) Date of Patent: *Jul. 18, 2023

(54) IN SITU BONDING OF CARBON FIBERS AND NANOTUBES TO POLYMER MATRICES

(71) Applicant: Rutgers, The State University of New Jersey, New Brunswick, NJ (US)

(72) Inventors: Thomas J. Nosker, Stockton, NJ (US); Jennifer K. Lynch-Branzoi, Belle Mead, NJ (US); Bernard H. Kear, Whitehouse Station, NJ (US); Nofel Z. Whieb, Hilla Babylon (IQ)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,499

(22) Filed: Jul. 8, 2021

(65) Prior Publication Data
US 2021/0371606 A1 Dec. 2, 2021

Related U.S. Application Data

(63) Continuation-in-part of application No. 16/319,692, filed as application No. PCT/US2017/043368 on Jul. 21, 2017, now Pat. No. 11,059,945.
(Continued)

(51) Int. Cl.
*C08J 5/06* (2006.01)
*C08J 5/00* (2006.01)
(Continued)

(52) U.S. Cl.
CPC .............. *C08J 5/06* (2013.01); *B29C 64/118* (2017.08); *B33Y 70/00* (2014.12); *B33Y 80/00* (2014.12);
(Continued)

(58) Field of Classification Search
None
See application file for complete search history.

(56) References Cited

U.S. PATENT DOCUMENTS 5,298,214 A 3/1994 Morrow et al.
5,789,477 A 8/1998 Nosker et al.
(Continued)

FOREIGN PATENT DOCUMENTS

CA 2909715 A1 10/2014
CA 2888865 C 5/2020
(Continued)

OTHER PUBLICATIONS

Dooher, et al: "Novel thermoplastic yarn for the through-thickness reinforcement of fibre-reinforced polymer composites", Journal of Thermoplastic Composite Materials, 2018, vol. 31(12), pp. 1619-1633.
(Continued)

*Primary Examiner* — Katie L. Hammer
(74) *Attorney, Agent, or Firm* — Fox Rothschild LLP

(57) ABSTRACT

A method for forming a carbon fiber-reinforced polymer matrix composite by distributing carbon fibers or nanotubes into a molten polymer phase comprising one or more molten polymers; and applying a succession of shear strain events to the molten polymer phase so that the molten polymer phase breaks the carbon fibers successively with each event, producing reactive edges on the broken carbon fibers that react with and cross-link the one or more polymers. The composite shows improvements in mechanical properties, such as stiffness, strength and impact energy absorption.

15 Claims, 12 Drawing Sheets

Related U.S. Application Data

(60) Provisional application No. 62/365,652, filed on Jul. 22, 2016.

(51) Int. Cl.
*C08J 3/22* (2006.01)
*B29C 64/118* (2017.01)
*B33Y 80/00* (2015.01)
*C08J 3/24* (2006.01)
*B33Y 70/00* (2020.01)
*C08K 3/04* (2006.01)
*C08J 3/20* (2006.01)

(52) U.S. Cl.
CPC ............... *C08J 3/203* (2013.01); *C08J 3/226* (2013.01); *C08J 3/242* (2013.01); *C08J 5/005* (2013.01); *C08K 3/041* (2017.05); *C08J 2371/00* (2013.01); *C08J 2377/06* (2013.01); *C08K 3/042* (2017.05); *C08K 3/046* (2017.05); *C08L 2205/22* (2013.01)

(56) References Cited

U.S. PATENT DOCUMENTS

| | | |
|---|---|---|
| 5,916,932 A | 6/1999 | Nosker et al. |
| 6,042,765 A | 3/2000 | Sugahara et al. |
| 6,962,431 B1 | 11/2005 | Luker |
| 7,465,605 B2 | 12/2008 | Raravikar et al. |
| 7,745,528 B2 | 6/2010 | Prud'Homme et al. |
| 7,906,053 B1 | 3/2011 | Torkelson et al. |
| 8,167,190 B1 | 5/2012 | Bullock et al. |
| 8,303,876 B1 | 11/2012 | Torkelson et al. |
| 8,734,696 B1 | 5/2014 | Torkelson et al. |
| 8,871,826 B2 | 10/2014 | Butzloff et al. |
| 9,139,440 B2 | 9/2015 | Felisari et al. |
| 9,597,657 B1 | 3/2017 | Zhamu et al. |
| 9,896,565 B2 | 2/2018 | Nosker et al. |
| 10,253,154 B2 | 4/2019 | Nosker et al. |
| 10,329,391 B2 | 6/2019 | Nosker et al. |
| 11,098,175 B2 | 8/2021 | Nosker et al. |
| 11,174,366 B2 | 11/2021 | Nosker et al. |
| 11,225,558 B2 | 1/2022 | Nosker et al. |
| 2005/0186378 A1* | 8/2005 | Bhatt ................ B82Y 30/00 428/36.9 |
| 2006/0047052 A1 | 3/2006 | Barrera et al. |
| 2006/0062986 A1 | 3/2006 | Magario et al. |
| 2007/0099792 A1 | 5/2007 | Khabashesku et al. |
| 2008/0279756 A1 | 11/2008 | Zhamu et al. |
| 2009/0087661 A1 | 4/2009 | Eder |
| 2010/0124713 A1* | 5/2010 | Farrugia ............. G03G 9/0902 430/108.1 |
| 2010/0147188 A1 | 6/2010 | Mamak et al. |
| 2010/0317790 A1 | 12/2010 | Jang et al. |
| 2011/0017955 A1 | 1/2011 | Zhamu et al. |
| 2011/0114189 A1 | 5/2011 | Crain et al. |
| 2011/0133134 A1 | 6/2011 | Varma et al. |
| 2011/0143058 A1 | 6/2011 | Nosker et al. |
| 2011/0186789 A1 | 8/2011 | Samulski et al. |
| 2011/0260116 A1 | 10/2011 | Plee et al. |
| 2012/0065299 A1 | 3/2012 | Lukehart et al. |
| 2012/0068124 A1 | 3/2012 | Dickinson et al. |
| 2012/0142832 A1 | 6/2012 | Varma et al. |
| 2012/0264836 A1 | 10/2012 | Felisari et al. |
| 2012/0328946 A1 | 12/2012 | Bosnyak et al. |
| 2013/0018204 A1 | 1/2013 | Jeon et al. |
| 2013/0072613 A1 | 3/2013 | Miltner et al. |
| 2013/0295367 A1 | 11/2013 | Compton et al. |
| 2014/0042390 A1 | 2/2014 | Gruner et al. |
| 2014/0058046 A1 | 2/2014 | Sawa et al. |
| 2014/0083752 A1 | 3/2014 | Walczak et al. |
| 2014/0094541 A1 | 4/2014 | Shah et al. |
| 2014/0141257 A1 | 5/2014 | Ranade et al. |
| 2014/0183415 A1 | 7/2014 | Song |
| 2015/0267030 A1 | 9/2015 | Nosker et al. |
| 2016/0009561 A1 | 1/2016 | Coleman et al. |
| 2016/0332136 A1 | 11/2016 | Zhang et al. |
| 2017/0207000 A1 | 7/2017 | Prestayko et al. |
| 2017/0218141 A1 | 8/2017 | Nosker et al. |
| 2017/0352868 A1 | 12/2017 | Zhamu et al. |
| 2019/0062521 A1 | 2/2019 | Nosker et al. |
| 2020/0362137 A1 | 11/2020 | Nosker et al. |
| 2021/0163747 A1 | 6/2021 | So et al. |

FOREIGN PATENT DOCUMENTS

| | | |
|---|---|---|
| CN | 101558455 A | 10/2009 |
| CN | 101817516 A | 9/2010 |
| CN | 103842422 A | 6/2014 |
| CN | 104884243 A | 9/2015 |
| CN | 104945659 A | 9/2015 |
| CN | 104945694 A | 9/2015 |
| CN | 105324241 A | 2/2016 |
| CN | 107074552 A | 8/2017 |
| CN | 107400246 A | 11/2017 |
| EP | 2287244 A1 | 2/2011 |
| EP | 2612889 A1 | 7/2013 |
| EP | 2905256 A1 | 8/2015 |
| JP | H08-053571 A | 2/1996 |
| JP | 2003-138145 A | 5/2003 |
| JP | 2003-531802 A | 10/2003 |
| JP | 2007-524735 A | 8/2007 |
| JP | 2008-266577 A | 11/2008 |
| JP | 2009-542839 A | 12/2009 |
| JP | 2011-038078 A | 2/2011 |
| JP | 2011-513167 A | 4/2011 |
| JP | 2012500179 A | 1/2012 |
| JP | 2012-136712 A | 7/2012 |
| JP | 2013018825 A | 1/2013 |
| JP | 2013-507477 A | 3/2013 |
| JP | 2013-233790 A | 11/2013 |
| JP | 2015537075 A | 12/2015 |
| JP | 2016-509122 A | 3/2016 |
| JP | 2016519191 A | 6/2016 |
| JP | 2017531052 A | 10/2017 |
| JP | 6393743 B2 | 9/2018 |
| JP | 2018138667 A | 9/2018 |
| JP | 2018-158453 A | 10/2018 |
| JP | 2019002021 A | 1/2019 |
| JP | S633703 B2 | 1/2020 |
| KR | 10-2011-0018024 A | 2/2011 |
| KR | 10-2012-0009978 A | 2/2012 |
| TW | 201315763 A | 4/2013 |
| TW | 201915053 A | 4/2019 |
| WO | 07145918 A2 | 12/2007 |
| WO | 2009018204 A1 | 2/2009 |
| WO | 2009029984 A1 | 3/2009 |
| WO | 2010107763 A1 | 9/2010 |
| WO | 2010115173 A1 | 10/2010 |
| WO | 2011/042800 A1 | 4/2011 |
| WO | 2011/055198 A1 | 5/2011 |
| WO | 2012013303 A1 | 2/2012 |
| WO | 2012020099 A1 | 2/2012 |
| WO | 2012/049121 A1 | 4/2012 |
| WO | 2012/133303 A1 | 10/2012 |
| WO | 2013013070 A2 | 1/2013 |
| WO | 2013/058181 A1 | 4/2013 |
| WO | 2013/146213 A1 | 10/2013 |
| WO | 2014/062226 A1 | 4/2014 |
| WO | 14172619 A1 | 10/2014 |
| WO | 20140172619 A1 | 10/2014 |
| WO | 2015044478 A1 | 4/2015 |
| WO | 2015112088 A2 | 7/2015 |
| WO | 2016018995 A1 | 2/2016 |
| WO | 16106312 A2 | 6/2016 |

OTHER PUBLICATIONS

Liu et al: "A Controllable Self-Assembly Method for Large-Scale Synthesis of Graphene Sponges and Free-Standing Graphene Films", Advanced Functional Materials, 2010, 20, 1930-1936, DOI: 10.1002/adfm.201000287 (XP-001554543).

(56) References Cited

OTHER PUBLICATIONS

Lu, et al.: "Preparation of Polyethylene/Expanded Graphite Intercalated Composites by In-situ Expanding Method", China Plastics, Jul. 31, 2009, vol. 23, No. 7, pp. 49-54.
Novoselov et al., "Electric Field Effect in Atomically Thin Carbon Films," Science (2004); 306:666-669.
Whieb, Nofel Z: "Processing, Characteristics and Properties of NT-Enhanced PA 66", Published May 2, 2018, A dissertation submitted to the Graduate School—New Brunswick, Rutgers, The State University of New Jersey, Oct. 2017.
Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.
Bao, et al.: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.
Randcastle Extrusion Systems, Inc., Nov. 1, 2006, XP055279030, retrieved from the Internet: URL: http://www.feedscrewdesigns.com/ubb/Forum1/HTML/000521.html [retrieved on Jun. 9, 2016], pp. 1-3.
Eda, et al: Chemically Derived Graphene Oxide: Towards Large-Area Thin-Film Electronics and Optoelectronics; Advanced Materials, 2010, vol. 22, pp. 2392-2415.
Choudhary, et al: "Polymer/Carbon Nanotube Nanocomposites", Aug. 17, 2011, Chapter 4, pp. 65-90, Retrieved from the Internet: <http://www.intechopen.com/books/carbon-nanotubes-polymer-nanocomposites/polymer-carbon-nanotube-nanocomposites>.
Nixon, A.: "Understanding Graphene—Part 1", Feb. 4, 2016. [retrieved Nov. 18, 2016], Retrieved from the Internet: <http://investorintel.com/technology-metals-intel/understanding-graphene-part-1-graphene-and-graphite/>.
Thomas Swan; "Elicarb Graphene Epoxy Dispersion", Advanced Materials, Publication [unknown].
Xie, et al. "Boron Nitride Nanosheets As New Barrier Additive For Plastic Packaging", New/Nano Materials. Retrieved from the Internet <URL: https://www.tcd.ie./Physics/research/groups/1d-nanostructures/files/posters/NewNano%20-%2034_poster_Shaobo%20Xie.pdf>, Publication [unknown, no earlier than 2013].
Jonathan N. Coleman: "Liquid Exfoliation of Defect-Free Graphene", Accounts of Chemical Research, 2013, vol. 46, No. 1, pp. 14-22.
Paton et al: "Scale-up of Liquid Exfoliation of Graphene", Thomas Swan Advanced Materials, Retrieved from the Internet: URL: https://www.tcd.ie/Physics/research/groups/1d-nanostructures/files/posters/ChemOnTubes%20Poster%20KP.pdf>. Publication [unknown, not earlier than 2014].
Paton et al: "Scalable Production of Large Quantities of Defect-Free Few-Layer Graphene by Shear Exfoliation in Liquids", Nature Materials, Jun. 2014, vol. 13, pp. 624-630.
Tewatia, et al: "High Shear Melt-Processing of Polyetherethereketone Enhanced Polysulfone Immiscible Polymer Blends", Antec Orlando, The Plastics Technology Conference, Orange County Convention Center, Orlando, FL, May 7-10, 2018.
Tewatia, et al: "Multi-Scale Carbon (Micro/Nano) Fiber Reinforcement of Polyetheretherketone Using High Shear Melt-Processing", Fibers, 2017, 5, 32; doi:10.3390/fib5030032, pp. 1-11.
Lynch, et al: Applying AImmiscible Polymer Blend Concepts to Achieve an Amplified Orientation and Property Effect on Multiscale Reinforced Compositions, Sep. 2012.
Luker, K., "Summary Results of a Novel Single Screw Compounder", SPE-ANTEC Technical Papers, 2007, pp. 459-463.
Luker, K., "Randcastle Extrusion Systems, Inc—Microtruder Brochure", III, 2008.
Lynch, et al: "Development of Novel One-Step Hybrid Processing", SPE-ANTEC Technical Papers, 2010, pp. 2076-2080.
Jordhamo, et al: "Phase Continuity and Inversion in Polymer Blends and Simultaneous Interpenetrating Networks", Polymer Engineering and Science, vol. 26, No. 8, Apr. 1986, pp. 517-524.
Dez-Pascual, et al: "High-Performance Nanocomposites Based on Polyetherketones", Progress In Materials Science, Pergamon Press, GB, vol. 57, No. 7, Mar. 4, 2012 (Mar. 4, 2012), pp. 1106-1190, XP028514432, ISSN: 0079-6425, DOI: 10.1016/J.PMATSCI.2012.03.003 [retrieved on Mar. 29, 2012].
Rangari et al: "Alignment of Carbon Nanotubes and Reinforcing Effects in Nylon-6 Polymer Composite Fibers", Nanotechnology Instititute of Physics Publishing, GB, vol. 19, No. 24, Jun. 18, 2008 (Jun. 18, 2008), pp. 1-9, XP002679937, ISSN: 0957-4484, DOI: DOI:10.1088/0957-4484/19/24/245703 [retrieved on May 12, 2008].
Peeterbroeck, et al: "How Carbon Nanotube Crushing Can Improve Flame Retardant Behaviour in Polymer Nanocomposites?", Macromolecular Rapid Communications, vol. 28, No. 3, Feb. 2, 2007 (Feb. 2, 2007), pp. 260-264, XP055669652, DE, ISSN: 1022-1336, DOI: 10.1002/marc.200600614.
Takase et al: "Dispersion of Carbon-Nanotubes in a Polymer Matrix by a Win-Screw Extruder", 2002, vol. 14, No. 2, pp. 126-131, Online ISSN 1883-7417, Print ISSN 0915-4027, <https://doi.org/10.4325/seikeikakou.14.126>, Retrieved on Internet: <<https://www.jstage.jst.go.jp/article/seikeikakou1989/14/2/14_2_126/_article/-char/ja>>.
Sathyanarayana et al: "Compounding of MWCNTs with PS in a Twin-Screw Extruder with Varying Process Parameters: Morphology, Interfacial Behavior, Thermal Stability, Rheology, and Volume Resistivity", Macromolecular Materials and Engineering, 2013, 298, 89-105.
"BASF Polystyrol 158 K Polystyrene (Global)", MatWeb Material Property Data, Retrieved from Internet Jul. 15, 2022; Retrieved from Internet: <https://www.matweb.com/search/datasheet.aspx?matguide-b011e2c0a7974492a5e0ed73c08a3454>.

\* cited by examiner

1% CNT

2% CNT

IN SITU BONDING OF CARBON FIBERS AND NANOTUBES TO POLYMER MATRICES

CROSS-REFERENCE TO RELATED APPLICATIONS

This application is a Continuation-in-Part of U.S. Nonprovisional patent application Ser. No. 16/319,692, filed Jan. 22, 2019, which is the U.S. National Phase of International Patent Application Serial No. PCT/US2017/043368, filed Jul. 21, 2017, which claims priority under U.S.C. § 119(e) of U.S. Provisional Patent Application No. 62/365,652, filed Jul. 22, 2016, the entire contents of which are incorporated herein by reference.

TECHNICAL FIELD

The present invention relates to high efficiency mixing methods to transform a polymer composite containing carbon fibers. The present invention also relates to methods to activate carbon fibers and nanotubes using in situ mechanical breakage or cutting of the fibers or nanotubes in the presence of a molten polymer.

BACKGROUND

Polymer compositions are being increasingly used in a wide range of areas that have traditionally employed the use of other materials, such as metals. Polymers possess a number of desirable physical properties, are light weight, and inexpensive. In addition, many polymer materials may be formed into a number of various shapes and forms and exhibit significant flexibility in the forms that they assume, and may be used as coatings, dispersions, extrusion and molding resins, pastes, powders, and the like.

There are various applications for which it would be desirable to use polymer compositions, which require materials with electrical conductivity. However, a significant number of polymeric materials fail to be intrinsically electrically or thermally conductive enough for many of these applications.

Most composites are made with the understanding that there will be only weak secondary bonds that exist between the fibers and polymer. This makes it necessary for very high aspect ratios of fibers to be used in order to get reasonable stress transfer, or else the fibers will slip upon load.

Some commercial applications of carbon fiber-reinforced polymer matrix composites (CF-PMCs) include aircraft and aerospace systems, automotive systems and vehicles, electronics, government defense/security, pressure vessels, and reactor chambers, among others.

Progress in the development of low cost methods to effectively produce carbon fiber-reinforced polymer matrix composites (CF-PMCs) remains very slow. Currently, some of the challenges that exist affecting the development of CF-PMCs viable for use in real world applications include the expense of the materials and the impracticality of the presently used chemical and/or mechanical manipulations for large-scale commercial production. It would thus be desirable for a low cost method to produce a CF-PMC suitable for large-scale commercial production that offers many property advantages, including increased specific stiffness and strength, enhanced electrical/thermal conductivity, and retention of optical transparency.

SUMMARY

The present disclosure is directed to the discovery that stronger primary bonds between carbon fibers and carbon based polymers can be created, making it possible to get very high stress transfer with much shorter fibers in the resulting composites. Thus the disclosure provides stiffer and stronger polymer-carbon fiber composites and methods for forming them. A variety of carbon fibers are useful in the methods, including single or multi-walled carbon nanotubes (SWCNTs and MWCNTs, respectively), carbon nanofibers and standard micron-sized carbon fibers. The method works well in conjunction with a variety of polymers that possess chemical groups having one or more double bonds (carbon-carbon double bonds, carbon-oxygen double bonds, etc.) or chemical groups having one or more tertiary carbons, viz.

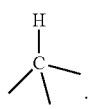

The fibers are broken in the presence of molten polymers during melt processing. Fiber breakage can be accomplished either by having a specially designed cutting tool in the melt processing equipment, or through high shear during melt processing, or by a combination of the two. The opening up of new fiber ends by breaking the fibers while surrounded by liquid polymers introduces dangling bonds, or reactive free radicals, on the fiber ends that represent sites for strong bonding by the polymers with the attributes mentioned above. The resulting solid composites have improved mechanical properties upon cooling, with optimal fiber length, and, consequently, cost can be greatly reduced by this bonding within the composite.

One aspect of the invention is directed to a method for forming a carbon fiber-reinforced polymer matrix composite, comprising: (a) distributing carbon fibers into a molten carbon-containing polymer phase comprising one or more molten carbon-containing polymers; (b) breaking the carbon fibers in the presence of the molten thermoplastic polymer phase by (i) applying a succession of shear strain events to the molten polymer phase so that the molten polymer phase breaks the carbon fibers, or (ii) mechanically cutting the carbon fibers, thereby producing reactive edges that react with and cross-link the one or more carbon-containing polymers; and (c) thoroughly mixing the broken or cut carbon fibers with the molten polymer phase. In one embodiment, at least one of the one or more carbon-containing polymers contains chemical groups having one or more double bonds or one or more tertiary carbons. In another embodiment, the molten carbon-containing polymer phase comprises a nylon, which can be nylon 66. In one embodiment of the method the carbon fibers are selected from the group consisting of single-walled carbon nanotubes (SWCNTs), multi-walled carbon nanotubes (MWCNTs), carbon nanofibers, and micron-sized carbon fibers.

Another aspect of the invention is directed to a method for forming a high-strength carbon fiber-reinforced polymer matrix composite, comprising: (a) forming the composite described above into cross-linked polymer particles; and (b) distributing the polymer particles into a non-cross-linked molten host matrix polymer.

Another aspect of the invention is directed to a carbon fiber-reinforced polymer matrix composite prepared according to the method described above. In one embodiment, the polymer is nylon 66. Another aspect of the invention is directed to a high strength carbon fiber-reinforced polymer matrix composite prepared according to the above method.

In some embodiments, the composite shows improved stiffness and strength versus a composite lacking covalent bonding between carbon fibers and polymer. In some embodiments, the composite shows improved impact energy absorption versus a composite lacking covalent bonding between carbon fibers and polymer.

A further aspect of the disclosure is directed to a polymer composite comprising polymer chains inter-molecularly cross-linked by broken carbon fibers having carbon atoms with reactive bonding sites on the broken edges of the fibers. Another aspect of the invention is directed to carbon fiber cross-linked polymer particles formed from the above composite. Another aspect is directed to a polymer composition comprising a host thermoplastic polymer and the carbon fiber cross-linked polymer particles disclosed above.

In one aspect, this disclosure provides a high strength carbon fiber-reinforced polymer matrix composite. The composite comprises cross-linked polymer particles distributed in a non-cross-linked molten host matrix polymer, wherein the cross-linked polymer particles consist essentially of carbon fibers distributed into a carbon-containing polymer phase comprising one or more carbon-containing polymers, wherein the polymers are cross-linked by direct covalent bonds to the ends of the carbon fibers, and wherein the carbon fibers are selected from the group consisting of single-walled carbon nanotubes, multi-walled carbon nanotubes, carbon nanofibers, and micron-sized carbon fibers.

In some embodiments, the polymer in the cross-linked polymer particles or the non-cross-linked molten host matrix polymer is selected from the group consisting of polyetherketones (PEK), Polyetherketoneketone (PEKK), polyphenylene sulfides (PPS), polyethylene sulfide (PES), polyetherimides (PEI), polyvinylidene fluoride (PVDF), polysulfones (PSU), polycarbonates (PC), polyphenylene ethers, aromatic thermoplastic polyesters, aromatic polysulfones, thermoplastic polyimides, liquid crystal polymers, thermoplastic elastomers, polyethylene, polypropylene (PP), polystyrene (PS), acrylics, ultra-high-molecular-weight polyethylene (UHMWPE), polytetrafluoro-ethylene (PTFE/Teflon®), polyamides (PA), polyphenylene oxide (PPO), polyoxy methylene plastic (POM/Acetal), polyarylether-ketones, polyvinylchloride (PVC), and mixtures thereof.

In some embodiments, the carbon fiber-reinforced polymer matrix composite comprises polymer chains inter-molecularly and directly cross-linked by broken carbon fibers, wherein the polymer to fiber cross-links consist essentially of direct covalent bonds to exposed ends of the broken carbon fibers, and the composite optionally further includes mechanically exfoliated graphene distributed therein.

In some embodiments, breaking of carbon fibers occurs through high shear melt processing.

In some embodiments, the composite comprises between about 0.1 and about 30 wt % carbon fibers based on the total composite weight. In some embodiments, the composite comprises between about 10 and about 30 wt % carbon fibers based on the total composite weight.

In some embodiments, the carbon fibers are selected from the group consisting of single-walled carbon nanotubes, multi-walled carbon nanotubes, carbon nanofibers, and micron-sized carbon fibers.

In some embodiments, the composite further comprises mechanically exfoliated graphene distributed therein.

In some embodiments, the amount of cross-linked polymer particles distributed in the non-cross-linked molten host matrix polymer is sufficient to provide the composite with improved stiffness and strength as compared to a composite lacking covalent bonding between carbon fibers and polymer.

In some embodiments, the amount of cross-linked polymer particles distributed in a non-cross-linked molten host matrix polymer is sufficient to provide the composite with improved impact energy absorption as compared to a composite lacking covalent bonding between carbon fibers and polymer.

In another aspect, this disclosure provides a carbon fiber-reinforced polymer matrix composite comprising carbon fibers distributed into a carbon-containing polymer phase comprising one or more carbon-containing polymers, and wherein the polymers are cross-linked by direct covalent bonds to the ends of the carbon fibers. In some embodiments, the polymer to 23 fiber cross-links consist essentially of direct covalent bonds to exposed ends of the broken carbon fibers.

In some embodiments, the carbon fiber-reinforced polymer matrix composite further comprises mechanically exfoliated graphene distributed therein.

In some embodiments, the polymer is selected from the group consisting of polyetherketones (PEK), Polyetherketoneketone (PEKK), polyphenylene sulfides (PPS), polyethylene sulfide (PES), polyetherimides (PEI), polyvinylidene fluoride (PVDF), polysulfones (PSU), polycarbonates (PC), polyphenylene ethers, aromatic thermoplastic polyesters, aromatic polysulfones, thermoplastic polyimides, liquid crystal polymers, thermoplastic elastomers, polyethylene, polypropylene (PP), polystyrene (PS), acrylics, ultra-high-molecular-weight polyethylene (UHMWPE), polytetrafluoro-ethylene (PTFE/Teflon®), polyamides (PA), polyphenylene oxide (PPO), polyoxy methylene plastic (POM/Acetal), polyarylether-ketones, polyvinylchloride (PVC), and mixtures thereof.

In another aspect, this disclosure further provides a filament for 3D printing formed of the composite or the carbon fiber cross-linked polymer particles described herein.

In another aspect, this disclosure additionally provides an automotive, aircraft or aerospace part formed from the composite described herein. In some embodiments, the part is an engine part.

BRIEF DESCRIPTION OF THE DRAWINGS

FIG. 7(a) provides evidence for adhesive bonding between a MWCNT and an amorphous or non-crystalline Nylon 66 matrix; that is, no covalent bonding is observed for a MWCNT having no broken ends in a Nylon 66 matrix. In contrast, FIG. 7(b) shows crystallization of denser Nylon 66 (less transparent to the electron beam) at or near the fractured end of a MWCNT.

DETAILED DESCRIPTION

Figure 1:
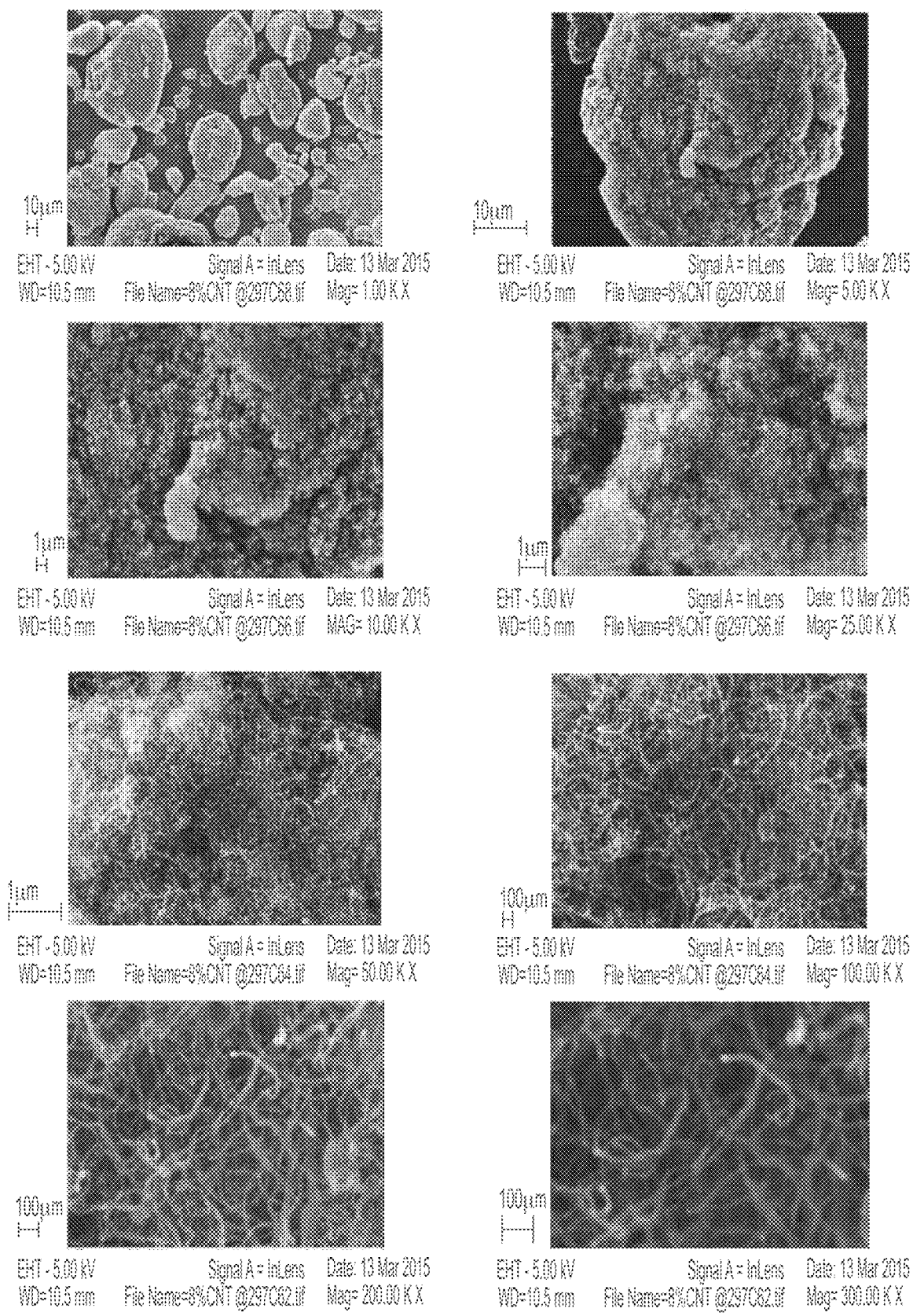
FIG. 1 displays a series of scanning electron microscopy (SEM) images, arranged from low-to-high magnification, showing that a typical as-synthesized particle consists of loosely-agglomerated multi-wall CNTs (MWCNTs).

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

One aspect of the present invention is directed to mechanical functionalization of carbon fibers processed in situ with molten polymers to create reactive bonding sites at the ends of the fibers. The reactive sites react with the polymer to chemically bond the carbon fibers to the polymer.

This can be done with a variety of carbon fibers, including single or multi-walled carbon nanotubes and standard micron sized carbon fibers. It works well in conjunction with a variety of polymers that possess chemical groups having double bonds (carbon-carbon double bonds, carbon-oxygen double bonds, etc.) or various tertiary carbon bonds. Similar observations of good bonding at sites of broken covalent graphite and graphene bonds have been made while mechanically exfoliating graphite into graphene in situ with polymers.

The fibers are broken or cut while in molten polymers during melt processing, and this can be done either by having a specially designed cutting tool in the melt processing equipment, or through high shear in the melt processing, or by a combination of the two. The opening up of new fiber ends by breaking or cutting the fibers while surrounded by liquid polymers introduces dangling bonds having unfilled valencies (free radicals) which provide reactive sites on the fiber ends, which represent sites for strong bonding, such as covalent bonding, by the polymers having the attributes mentioned above. The resulting solid composites have improved mechanical properties upon cooling, and the optimal fiber length, and, subsequently, cost will be greatly reduced by this bonding.

The following term(s) shall have, for purposes of this application, the respective meanings set forth below:

The term "polyetherketone" (PEK) denotes polymers characterized by a molecular backbone having alternating ketone and ether functionalities. The most common PEK are polyaryl (PAEK) which contain an aryl or phenyl group linked in the 1- and 4-positions between the functional groups. The very rigid backbone gives such polymers very high glass transition and melting temperatures compared to other plastics. The most common of these high-temperature resistant materials is polyetheretherketone (PEEK). Other representatives of polyetherketones include PEKK (poly(etherketoneketone)), PEEEK (poly(etheretheretherketone)), PEEKK (poly(etheretherketoneketone)) and PEKEKK (poly(etherketone-etherketoneketone)).

In one aspect, the present invention provides a high efficiency mixing method to transform a polymer composite that contains carbon fibers into broken carbon fibers having reactive ends or edges, by compounding in a batch mixer or extruder that imparts repetitive, high shear strain rates. The method is low cost to produce a CF-PMC that offers numerous property advantages, including increased specific stiffness and strength, enhanced electrical/thermal conductivity, and retention of optical transparency. Furthermore, these properties are tunable by modification of the process, vide infra. In some cases, an inert gas or vacuum may be used during processing. Other advantages of in situ carbon fiber breaking are that it avoids handling size reduced carbon fibers, and also avoids the need to disperse them uniformly in the polymer matrix phase. Superior mixing produces finer composite structures and very good particle distribution.

It should be understood that essentially any polymer inert to carbon fibers or nanotubes and capable of imparting sufficient shear strain to achieve the desired carbon fiber breakage may be used in the method of the present invention. Examples of such polymers include, without limitation, poly-etheretherketones (PEEK), polyetherketones (PEK), polyphenylene sulfides (PPS), polyethylene sulfide (PES), polyetherimides (PEI), polyvinylidene fluoride (PVDF), polysulfones (PSU), polycarbonates (PC), polyphenylene ethers, aromatic thermoplastic polyesters, aromatic polysulfones, thermoplastic polyimides, liquid crystal polymers, thermoplastic elastomers, polyethylene, poly-propylene, polystyrene (PS), acrylics, such as polymethylmethacrylate (PMMA), polyacrylo-nitrile (PAN), acrylonitrile butadiene styrene (ABS), and the like, ultra-high-molecular-weight polyethylene (UHMWPE), polytetrafluoroethylene (PTFE/Teflon®), polyamides (PA) such as nylons, polyphenylene oxide (PPO), polyoxymethylene plastic (POM/Acetal), polyarylether-ketones, polyvinylchloride (PVC), mixtures thereof and the like. Polymers capable of wetting the carbon fiber surface may be used as well as high melting point, amorphous polymers in accordance with the method of the present invention.

Carbon fiber-reinforced polymers according to the present invention typically contain between about 0.1 and about 30 wt % carbon fibers or nanotubes. More typically, the polymers contain between about 1.0 and about 10 wt % carbon fibers or nanotubes. According to one embodiment, the carbon fiber-reinforced polymer matrix composite contains from 1 wt % to 10 wt %, or from 2 wt % to 9 wt %, or from 3 wt % to 8 wt %, or from 4 wt % to 7 wt %, or from 5 wt % to 6 wt % carbon fibers or nanotubes (based on the total composite weight). Polymer master batches typically contain up to about 65 wt % carbon fibers or nanotubes, and more typically between about and about 50 wt % carbon fibers or nanotubes. According to one embodiment, the master batches contain between about 10 and about 30 wt % carbon fibers or nanotubes.

Mechanical functionalization of carbon fibers within a polymer matrix may be accomplished by a polymer processing technique that imparts repetitive high shear strain events to mechanically break the carbon fibers within the polymer matrix.

A succession of shear strain events is defined as subjecting the molten polymer to an alternating series of higher and lower shear strain rates over essentially the same time intervals so that a pulsating series of higher and lower shear forces associated with the shear strain rate are applied to the carbon fibers in the molten polymer. Higher and lower shear strain rates are defined as a first higher, shear strain rate that is at least twice the magnitude of a second lower shear strain rate. The first shear strain rate will range between 100 and 10,000 sec$^{-1}$. At least 1,000 to over 10,000,000 alternating pulses of higher and lower shear strain pulses are applied to the molten polymer in order to break the carbon fibers.

After high-shear mixing, the mechanically size reduced carbon fibers are uniformly dispersed in the molten polymer, are randomly oriented, and have high aspect ratio.

In one embodiment, graphite microparticles are also added to the molten polymer and are mechanically exfoliated into graphene via the succession of shear strain events. Graphite microparticles are generally no greater than 1,000 microns in size, and the extent of exfoliation of the graphite microparticles can generally be from 1 to 100%, resulting in a graphene to graphite weight ratio ranging from 1:99 to 100:0. Such an exfoliation method is disclosed in US 2015/0267030, the entire disclosure of which is incorporated herein by reference.

The amount of graphite added to the molten polymer can be an amount up to and including the amount of carbon fibers and nanotubes added, provided that the total content of carbon fibers, nanotubes and resulting graphene or mixture of graphite and graphene does not exceed 65 wt %. Typically, the weight ratio of graphene, or a mixture of graphite and graphene, to carbon fibers and/or nanotubes ranges between 5:95 and 50:50, and more typically between 25:75 and 33:67.

In one embodiment, the extrusion compounding elements are as described in U.S. Pat. No. 6,962,431, the disclosure of which is incorporated herein by reference, with compounding sections, known as axial fluted extensional mixing elements or spiral fluted extensional mixing elements. The compounding sections act to elongate the flow of the polymer and carbon fibers, followed by repeated folding and stretching of the material. This results in superior distributive mixing, which in turn, causes progressive breakage of the carbon fibers. Batch mixers may also be equipped with equivalent mixing elements. In another embodiment, a standard-type injection molding machine is modified to replace the standard screw with a compounding screw for the purpose of compounding materials as the composition is injection molded. Such a device is disclosed in US 2013/0072627, the entire disclosure of which is incorporated herein by reference.

Automated extrusion systems are available to subject the composite material to as many passes as desired, with mixing elements as described in U.S. Pat. No. 6,962,431, and equipped with a re-circulating stream to direct the flow back to the extruder input. Since processing of the carbon fiber-reinforced polymer is direct and involves minimal handling of carbon fibers, fabrication costs are low.

The shear strain rate within the polymer is controlled by the type of polymer and the processing parameters, including the geometry of the mixer, processing temperature, and speed in revolutions per minute (RPM).

The required processing temperature and speed (RPM) for a particular polymer is determinable from polymer rheology data given that, at a constant temperature, the shear strain rate ($\dot{\gamma}$) is linearly dependent upon RPM, as shown by Equation 1. The geometry of the mixer appears as the rotor radius, r, and the space between the rotor and the barrel, $\Delta r$.

$$\dot{\gamma} = \left(\frac{2\pi r}{\Delta r}\right)\left(\frac{RPM}{60}\right) \qquad \text{Equation 1}$$

Polymer rheology data collected for a particular polymer at three different temperatures provides a log shear stress versus log shear strain rate graph.

Examples of host polymers include, but are not limited to, polyetheretherketone (PEEK), polyetherketone (PEK), polyphenylene sulfide (PPS), polyethylene sulfide (PES), polyether-imide (PEI), polyvinylidene fluoride (PVDF), polysulfone (PSU), polycarbonate (PC), polyphenylene ether, aromatic thermoplastic polyesters, aromatic polysulfones, thermo-plastic polyimides, liquid crystal polymers, thermoplastic elastomers, polyethylene, polypropylene, polystyrene (PS), acrylics such as polymethylmethacrylate (PMMA), polyacrylonitrile (PAN), acrylonitrile butadiene styrene (ABS), and the like, ultra-high-molecular-weight polyethylene (UHMWPE), polytetrafluoroethylene (PTFE/Teflon®), polyamides (PA) such as nylons, polyphenylene oxide (PPO), polyoxymethylene plastic (POM/Acetal), polyimides, polyarylether-ketones, polyvinylchloride (PVC), acrylics, mixtures thereof and the like. When the host polymer and the cross-linked polymer are the same polymer species, the cross-linked polymer particles are essentially a concentrated masterbatch of the degree of cross-linked species desired to be introduced to the polymer formulation.

In another aspect, this disclosure further provides a filament for 3D printing formed of the composite or the carbon fiber cross-linked polymer particles described herein. The 3D printing filament technique including the composite or the carbon fiber cross-linked polymer particles described herein advantageously has remarkably improved strength and stiffness as well as improved impact energy absorption.

Recently, due to technology development including 3D printing material development and economic availability, a 3D printer capable of molding a three-dimensional object is being used in a variety of industry fields, and receptivity of the technology thereof is increasing. The 3D printing is a method of molding a product by transmitting a 3D design drawing of a computer to the 3D printer, and in the product molding method of the 3D printer, a raw material such as a resin is melted and then compressed through a nozzle to stack a thin hardened layer.

In some embodiments, the filament may include the composite or the carbon fiber cross-linked polymer particles described herein and an additional polymer. In some embodiments, the filament may include about 0.01 wt % to about 100 wt % (e.g., about 1 wt % to about 90 wt %, about 5 wt % to about 50 wt %, about 10 wt % to about 30 wt % of the disclosed composite or carbon fiber cross-linked polymer particles based on the total weight of the filament.

Processing and Characteristics of CNT-Reinforced Nylon 66 Composites

A polymer-carbon nanotube composite (PCNC) differs from a conventional carbon-fiber composite in that there is a much higher interface area between reinforcing carbon and polymer matrix phases. It has been proposed that introducing a uniform distribution of carbon nanotubes (CNTs) into a polymer matrix should yield property enhancements that go beyond that of a simple rule of mixtures. The challenge is to take full advantage of the exceptional properties of CNTs in the composite material.

Carbon nanotubes are considered to be ideal reinforcing material for polymer matrices because of their high aspect ratio, low density, remarkable mechanical properties, and good electrical/thermal conductivity. One of the matrices that has been studied is commercially important Nylon 66. However, property improvements have not been significant to date, apparently due to poor interfacial CNT/polymer bonding and severe CNT agglomeration.

These obstacles have now been overcome by utilizing a new processing route that involves high-shear mixing in a molten polymer to induce de-agglomeration and dispersal of CNTs, while enhancing adhesive bonding and covalent bonding by creating new sites on the CNTs to which the polymer chains can bond. An attempt is also being made to increase impact energy absorption by forming a biphasic composite, comprising a high fraction of strong CNT-reinforced Nylon particles uniformly dispersed in a tough Nylon matrix.

A carbon nanotube (CNT) consists of a sheet of hexagonal-bonded carbon atoms rolled up to form a tube. A single-walled carbon nanotube (SWCNT) comprises a single layer of this tubular structure of carbon atoms. However, the structure of a multi walled carbon nanotube (MWCNT) is still open to some debate. In one model, a MWCNT is imagined to be a single graphene sheet rolled up into a scroll. In another model, a MWCNT is considered to be made of co-axial layers of helically-aligned carbon hexagons, with matching at the joint lines, leading to a nested-shell structure. In yet another model, a combination of scroll-like and nested-shell structures has been proposed.

It is known that increases in elastic modulus and strength of Nylon-CNT composite resulted from making small additions of CNTs to polymer matrices. While Van der Waals bonding dominates interactions between CNTs and polymers, adhesion in some CNT composites also occurs via covalent bonds, which has been shown to play a role in reinforcement of CNT composites.

Measurements by AFM of the pull-out force necessary to remove a given length of an individual MWCNT embedded in polyethylene-butene copolymer has demonstrated covalent bonding between the outer layer of a MWCNT and the polymer matrix. It also showed that the polymer matrix in the near vicinity to the interface behaved differently than the polymer in the bulk, which is attributed to the outer diameter of a CNT having the same magnitude as the radius of gyration of the polymer chain.

Because of the tendency of CNTs to agglomerate, difficulty of aligning them in the matrix and often poor load transfer, there have been a number of reported attempts to produce composites using different polymer matrix phases.

The present invention provides remarkable improvements in stiffness and strength of a CNT-reinforced Nylon composite, vide infra. The composites are characterized by an increase in impact energy absorption. Processing parameters which achieve superior mechanical properties and performance are provided herein.

EXAMPLES

The present invention is further illustrated by the following examples, which should not be construed as limiting in any way.

Modified Randcastle Extrusion System Small Scale Extension Mixer:

The design of the existing small batch mixer may be modified to provide higher shear rate, which in turn provides superior mechanical breakage of the carbon fibers within the polymer matrix. The shear rate, $\dot{\gamma}$, is calculated according to Equation 1, where r is the tooling radius and $\Delta r$ is the clearance for compounding. Machine modifications are listed in the Table below, along with the maximum achievable shear rate. The newly designed mixer has a maximum shear rate 22 times that of the current mixer, which will provide enhanced mechanical breakage of carbon fibers within a polymer matrix at shorter lengths of time. In other words, the crystal size, D, may be reduced to smaller dimensions in a more efficient length of time.

TABLE

Modifications of the Randcastle Extrusion System's Small Scale Extension Mixer to provide enhanced mechanical functionalization of carbon fibers

|  | Current Randcastle Mixer | Improved Randcastle Mixer |
| --- | --- | --- |
| Tooling Radius (inches) | 0.5 | 1 |
| Clearance for Compounding, $\Delta r$ (in) | 0.04 | 0.01 |
| Maximum RPM | 100 | 360 |
| Maximum Shear Strain Rate ($sec^{-1}$) | 133 | 2900 |

Modified Single Screw Extrusion:

Randcastle has made modifications to the extruder screw that will better enable mechanical breakage of carbon fibers in a polymer matrix to fabricate a CF-PMC.

Example 1

Materials and Processing Parameters

Well-characterized MWCNT powder, with particle size in the 10-50 μm range, was acquired from CNano Technology. A sequence of back-scattered SEM micrographs, FIG. 1, shows that a typical particle consists of loosely-agglomerated multi-wall CNTs (MWCNTs), most of which are about 30-40 nm in diameter and >1 μm in length, i.e. have high aspect ratios. In several cases, the CNTs have white-contrasting tips, which are transition-metal catalyst particles. Hence, it is apparent that the CNTs are produced by the particle-at-the-tip growth mechanism.

Figure 2:
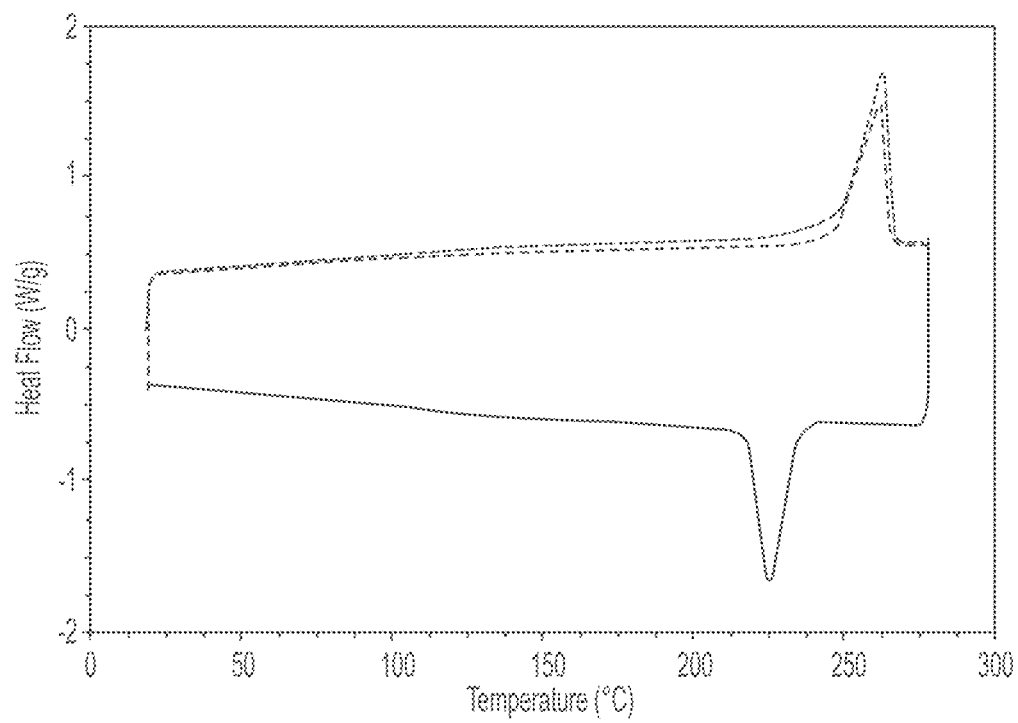
FIG. 2 displays DSC heating-cooling-heating curves for Nylon 66, indicating 267° C. melting point, 225° C. freezing point and a glass transition temperature of about 60° C.

Pelletized Nylon 66, with pellet size in the 1-5 mm range, was acquired from Dupont Inc. A differential scanning calorimetry (DSC) curve, FIG. 2, shows that the melting and freezing temperatures are 267° C. and 225° C., respectively; glass transition temperature is about 60° C. Since Nylon 66 readily adsorbs water upon exposure to ambient air, as-received and processed powders are vacuum-dried at 85° C. for 24 hours before further processing.

A laboratory-scale high-shear mixer with 100 g capacity, was used to disperse the MWCNTs in molten Nylon 66. Using a rotor/barrel gap distance of about ⅓ inch, efficient mixing of the two components was accomplished through the high-shear stresses developed from the rotational motion of the rotor inside the barrel. To prevent degradation during processing, Argon gas was introduced into the mixing chamber at a flow rate of 0.244 Cft/hour.

Figure 3:
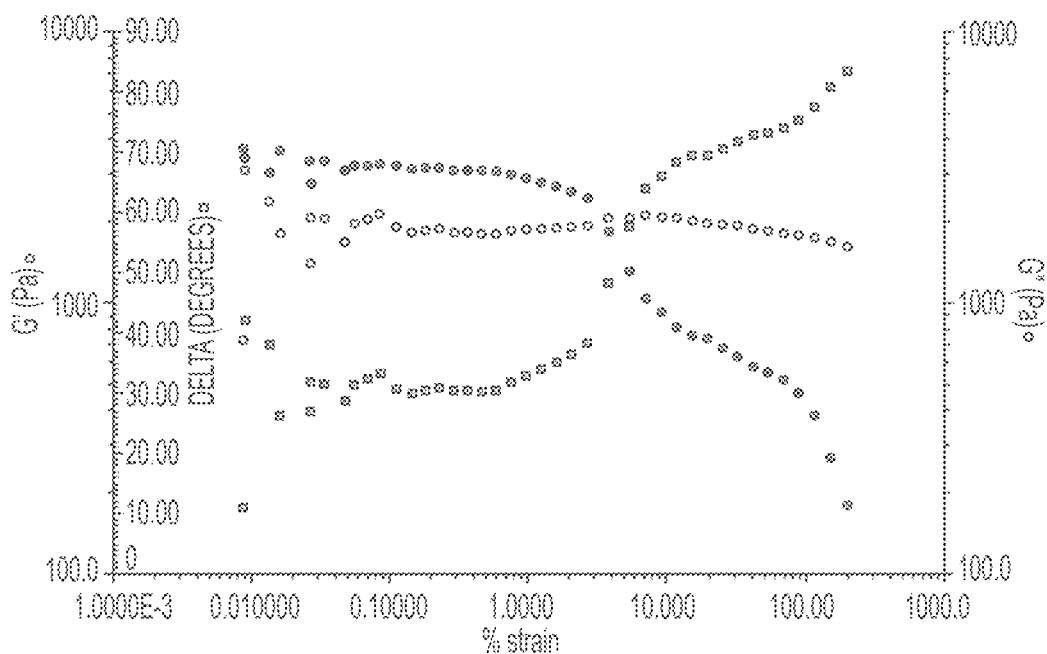
FIG. 3 shows stress-sweep curves for Nylon 66, indicating that the Linear Viscosity Region (LVR) is around 0.4% strain.
Figure 4:
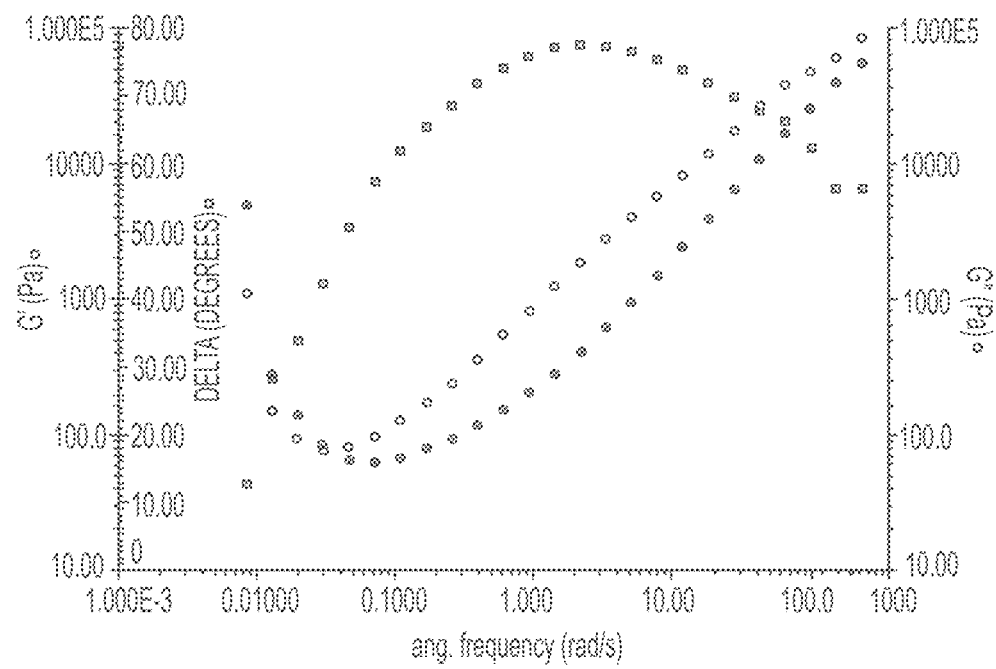
FIG. 4 displays frequency-sweep curves for Nylon 66 at 0.4% strain.
Figure 5:
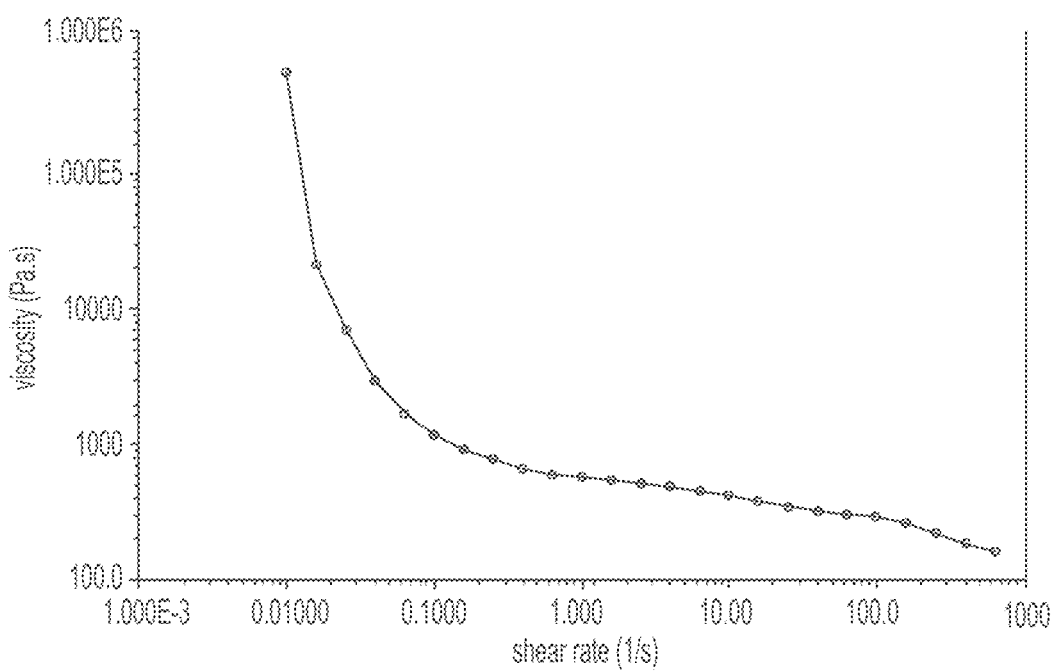
FIG. 5 displays frequency-sweep curves for Nylon 66, indicating that the viscosity decreases with increasing shear rate (viscosity vs. shear rate).
Figures 6A, 6B, 6C, 6D:
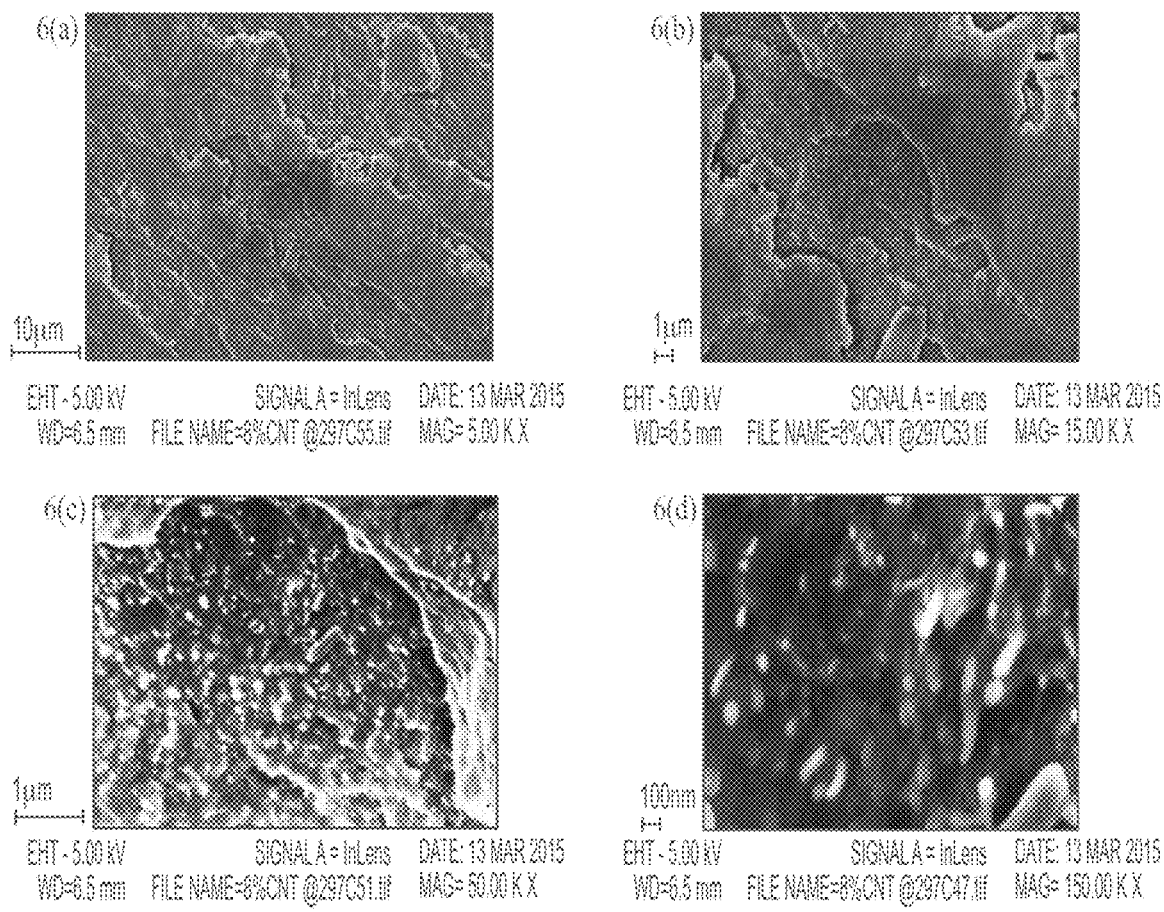
FIGS. 6(a) through 6(d) display a series of SEM images arranged from low-to-high magnification, providing evidence for pull-out of CNTs, after cryogenic fracture of an 8% CNT-reinforced Nylon composite.

To locate the linear viscosity region (LVR) of Nylon 66, a stress-sweep test was performed at 277° C. using a R2000 rheometer, with a frequency of 1 Hz and 10 points per decade (log mode). FIG. 3 shows that the (LVR) occurs at about 0.4% strain. To examine the behavior of the polymer at this processing temperature, a frequency-sweep test was performed. FIG. 4 shows curves for G' (Pa), G" (Pa) and Delta (degrees) vs. angular frequency (rad/sec). This data is converted to viscosity (Pa·s) vs. shear rate (1/sec) in FIG. 5, which shows that the viscosity of Nylon decreases as the shear rate increases.

These data indicate that to process a CNT-reinforced Nylon 66 composite in the high-shear mixer, a mixing temperature of 277° C. (i.e. 10° C. above the melting point of Nylon 66) is required to yield adequate viscosity and shear rate. A mixing temperature of 10° C. above the polymer melting point is considered to be a minimum for nylon 66, and would be expected to be different for other polymers.

Example 2

Processing of Composites

Loosely agglomerated MWCNT powder was cold pressed in a Carver press, using a pressure of 4.5 metric tons and holding time of 5 minutes to produce a compacted MWCNT. After pressing, the compact was broken up into small pieces and vacuum dried. Following degassing, the now much denser CNT powder was introduced into the mixing unit and dispersed in the Nylon 66 melt.

When the front and back sections of the mixing unit reach 10° C. above the 267° C. melting temperature of Nylon 66: 1) rotor speed was raised gradually up to 50 rpm in 10 minutes, and held at this speed for an additional 10 minutes; 2) 30 g of Nylon 66 was gradually fed into the mixer and melted; 3) small pieces of cold-pressed CNT powder were added to the molten polymer while ensuring good mixing; and 4) after feeding the desired amount of CNT powder (8 g) and Nylon 66 (92 g) into the mixer, the mixing parameters were fixed at 50 rpm to maintain viscosity as low as possible. To stabilize the mixing parameters, mixing speed was raised to about 75 rpm, where it was held for 6 min to complete the mixing process. Thereafter, the mixing speed was reduced gradually until the system automatically shut down due to the rapid increase in viscosity.

Incremental additions of CNTs to the molten Nylon are necessary to produce a composite that contains a high fraction of CNTs. It takes about 45 min to ensure that mixing parameters remain as stable as possible. The rapid increase in melt viscosity during mixing is attributed to chemical bonding between dispersed CNTs and Nylon polymer matrix. After completion of the mixing process, the composite material, now having a rubber-like consistency, was extracted from the barrel at the mixing temperature. Upon cooling to ambient temperature, the material became hard and brittle. This is further evidence for chemical bonding between dispersed CNTs and Nylon 66 matrix.

Larger samples of CNT-reinforced Nylon can be prepared using an integrated high shear mixing and injection molding apparatus. ASTM standard test bars can be fabricated and evaluated for mechanical properties. Preliminary tests performed on small samples indicate significant improvements in stiffness and strength.

Example 3

Characteristics of Composites

FIGS. 6(a) through 6(d) show SEM images of a cryogenically-fractured surface of CNT-reinforced Nylon composite. The low-magnification image shows a banded structure composed of alternating regions of slightly different elevations. Interestingly, the low-elevation regions show evidence for pull-out of CNTs in the composite, but the high elevation regions do not, indicating that in these regions the fracture path cuts right through the CNTs. Even so, it is apparent that the high-shear mixing process has efficiently dispersed the original CNT agglomerates, forming a uniform distribution of CNTs in a Nylon matrix. See in particular FIG. 6(b).

Figures 7A, 7B:
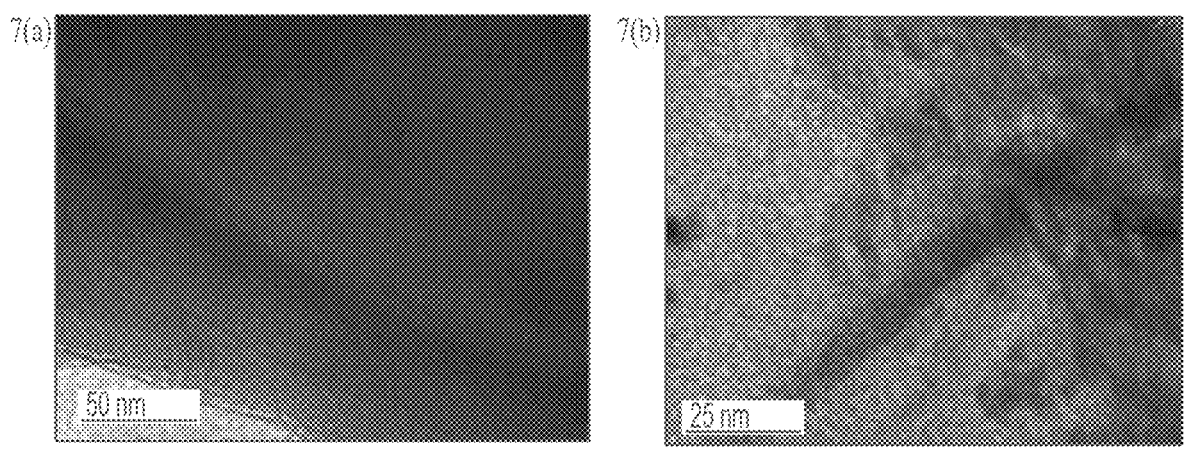
FIGS. 7(a) and 7(b) display transmission electron microscopy (TEM)images.
Figure 8A:
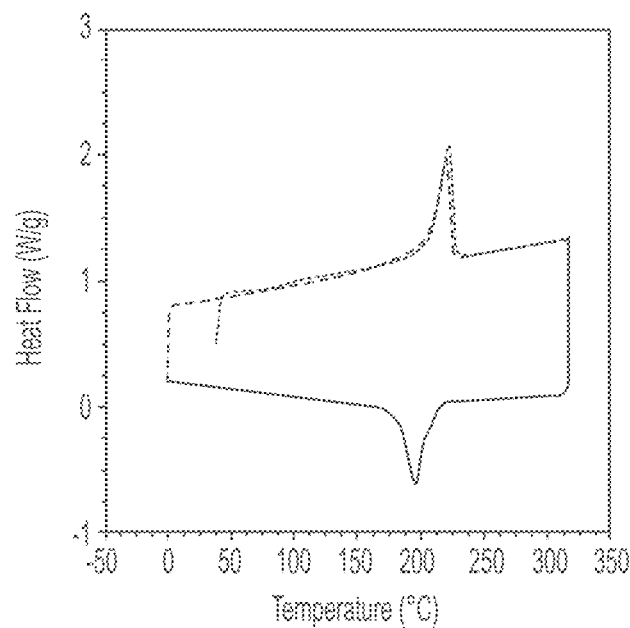
FIGS. 8(a) through 8(f) display DSC heating-cooling-heating curves for Nylon 66 composites of the invention containing 1% to 6% CNT, respectively.
Figure 8B:
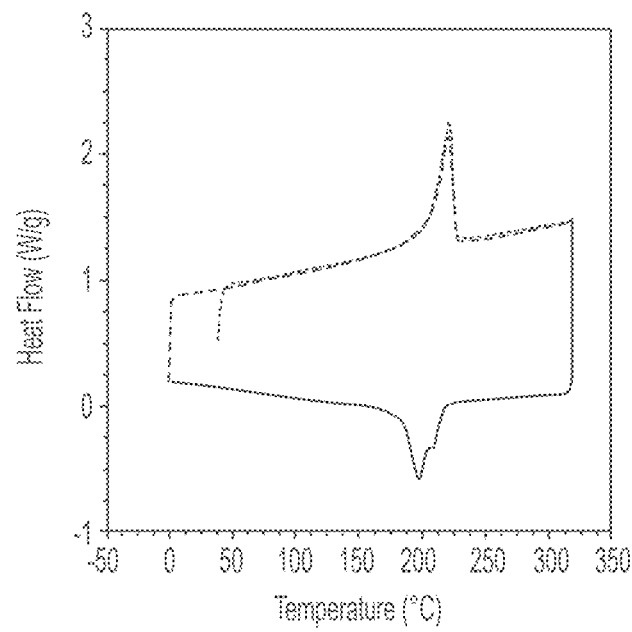
Figure 8C:
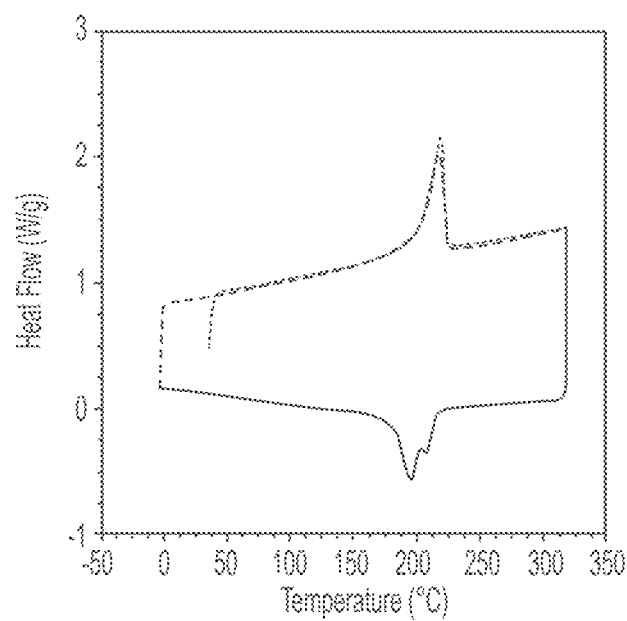
Figure 8D:
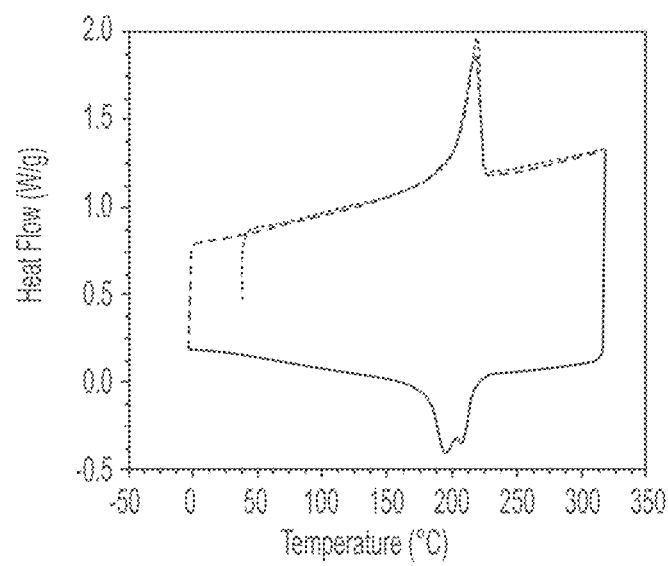
Figure 8E:
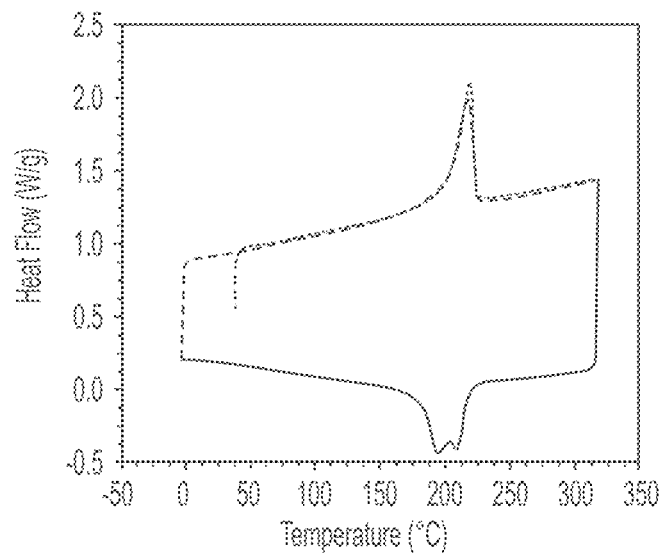
Figure 8F:
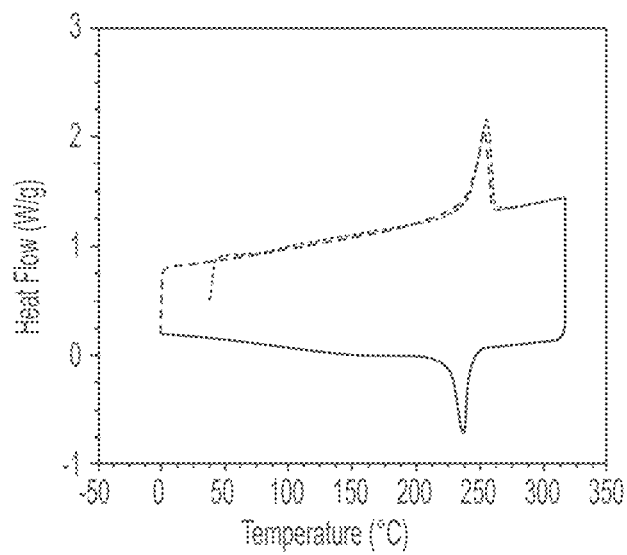

FIGS. 7(a) and 7(b) show representative TEM images of thin-tapered edges of cryogenically-milled particles. These thin edges are difficult to find, since only a tiny fraction of particles have edges that are thin enough to allow transmission of the electron beam. In FIG. 7(a), a single MWCNT is in intimate contact with the Nylon 66 matrix, which is indicative of good adhesive bonding; however no covalent bonding is observed for a MWCNT having no broken ends in a Nylon 66 matrix. In contrast, whenever a MWCNT terminates in the field of view, dark-contrasting regions are observed. An example is shown in FIG. 7(b), which is interpreted to be evidence for the presence of crystalline Nylon 66, which is denser than the surrounding amorphous matrix, the crystallization of the polymer being induced by covalent bonding of the MWCNT to the polymer. See also FIGS. 9(a) to 9(c). Further, the TEM observations revealed significant reduction in the length of CNTs.

FIGS. 8(a) through 8(f) show the DSC curves of composites which are mixtures of Nylon 66 and different percentages of long carbon nanotubes, from 1% to 6%, prepared by processing according to the disclosure. They were prepared at normal nylon process temperatures (about 300° C.) in a high shear batch mixer modified as described below, for 20 minutes. Under high shear mixing the long aspect fibers are broken, and covalently bond polymer to the ends of the fibers. The figures display the normal melt peak and crystallization temperature for Nylon 66 itself (no carbon nanotubes covalently bound; see also FIG. 2), and a second peak having a higher recrystallization temperature for the polymer covalently bonded to CNTs. The latter peak successively increases as the percentage of CNTs in the composition increases. A dramatic difference occurs between 5% and 6% CNTs. By 6% CNTs, the higher melt temperature of the covalent adduct has taken over, with a new crystal form being indicated. Overall there is about a 50-degree shift in melting and recrystallization points of Nylon 66 as the carbon nanotube concentration is varied from 1% to 6%, with breakage of the carbon nanotubes in situ. This has not been observed or reported previously.

Figure 9A:
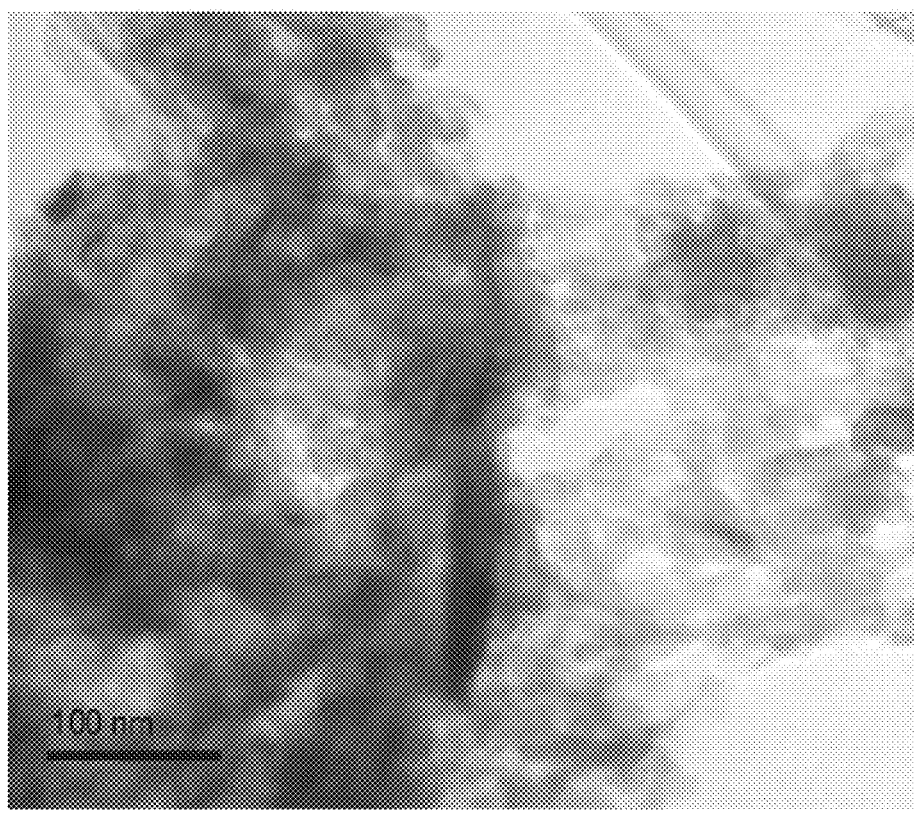
FIGS. 9(a) through 9(c) display TEM images of a MWCNT in a Nylon 66 matrix with freshly broken ends where bonding is promoted. The pictures show a high density of polymer at the broken ends of the CNTs, indicating covalent bonding between the nanotubes and the Nylon 66 polymer.
Figure 9B:
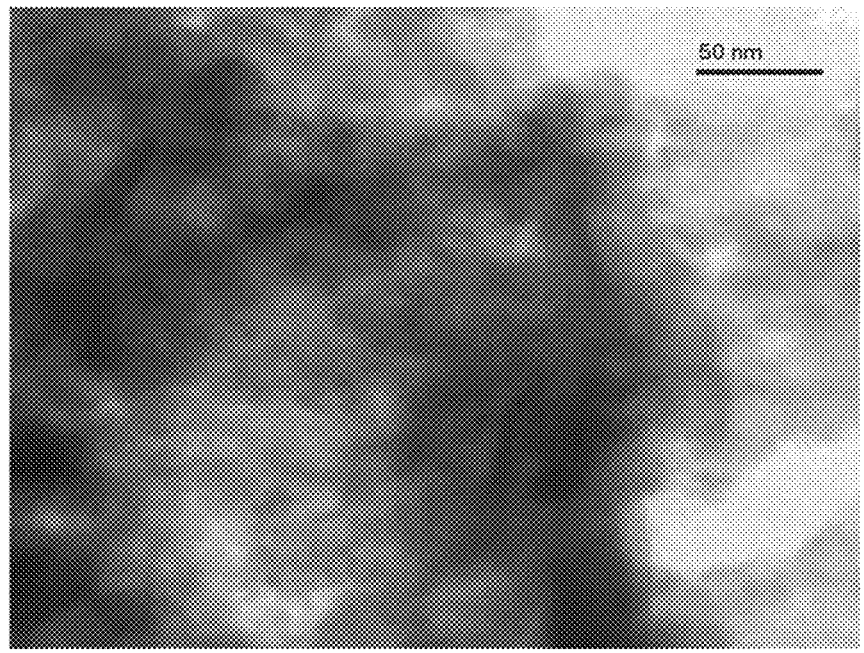
Figure 9C:
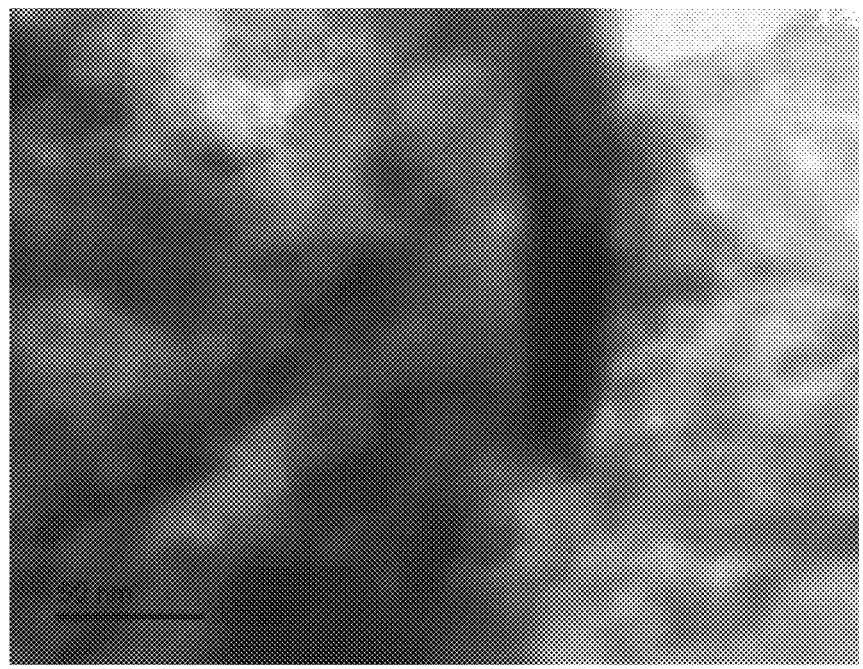

FIGS. 9(a) through 9(c) display TEM images of a MWCNT with freshly fractured ends where bonding is observed with a Nylon 66 matrix. Also see FIG. 7(b). The pictures show a high density of polymer at the broken ends of the CNTs, indicating covalent bonding between the nanotubes and the Nylon 66 polymer, vide supra. In contrast FIG. 7(a) displays a TEM image showing that for a MWCNT having no broken ends, no bonding is observed to the Nylon 66 matrix. This indicates that covalent bonding has occurred between the nanotube fractured ends and the Nylon 66 polymer when processed according to the present disclosure, which has not been previously observed or reported.

Such observations indicate that crystallization of Nylon 66 can be initiated during high-shear mixing whenever CNTs experience fracture, thus exposing many dangling and reactive orbitals (free radicals) to bond with the molten polymer. This happens at a temperature above the melting point of Nylon 66, which is taken to be evidence for strong covalent bonding between freshly-fractured ends of MWCNTs and molten Nylon 66.

Example 4

Figure 10:
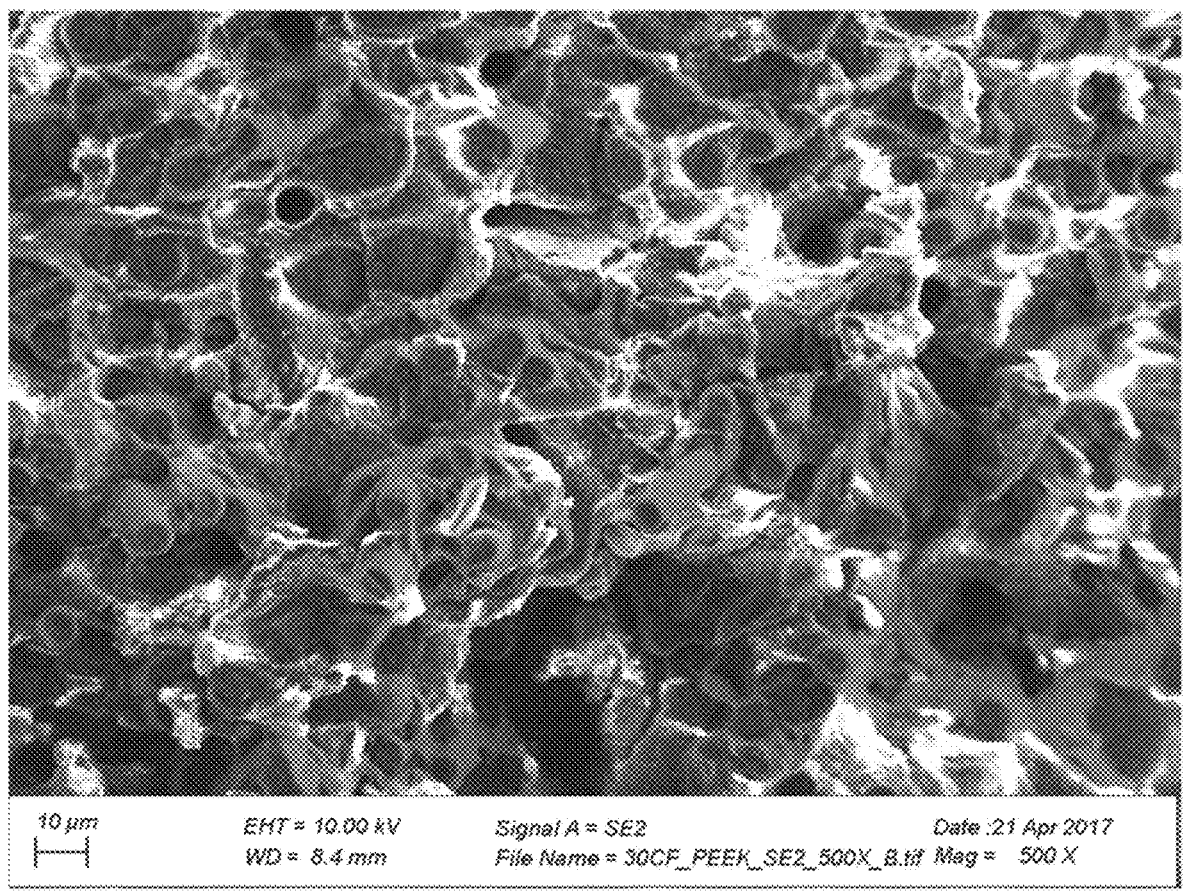
FIG. 10 shows an SEM micrograph of 30 wt. % carbon fiber (CF) in PEEK prepared using high shear melt-processing of continuous CF cut to 1 m lengths and PEEK.
Figure 11A:
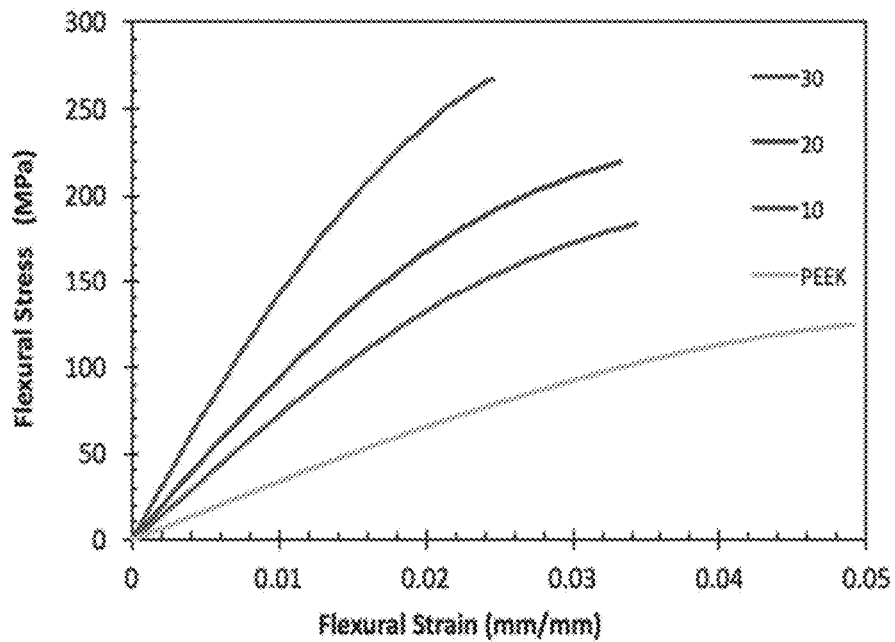
FIGS. 11(a) through (d) show the mechanical properties of CF-reinforced PEEK as a function of increasing CF concentration prepared using high shear melt-processing of continuous CF cut to 1 m lengths and PEEK as follows: (a) flexural stress-strain curves; (b) flexural modulus; (c) flexural strength; and (d) Izod impact resistance.
Figure 11B:
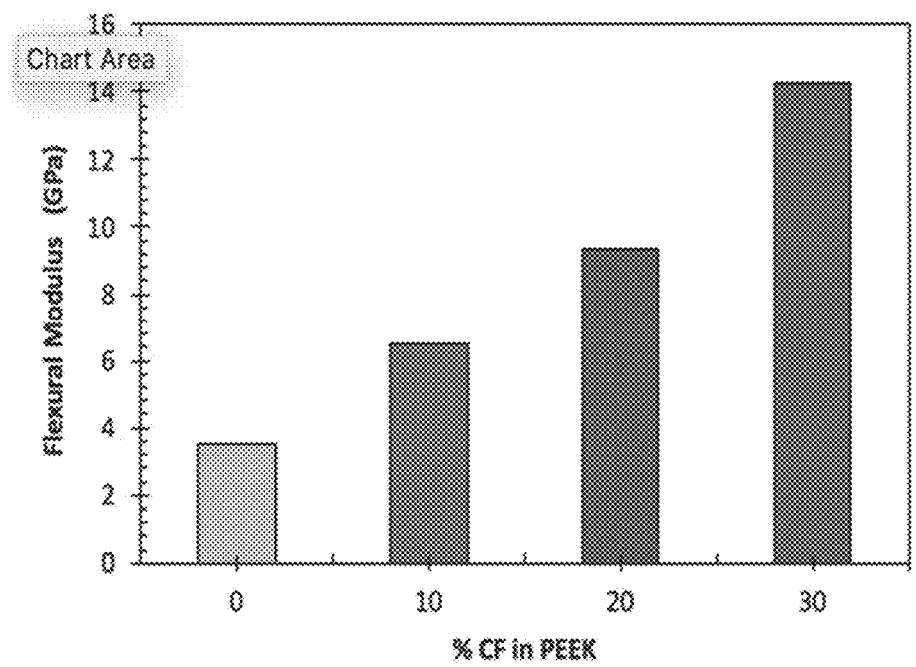
Figure 11C:
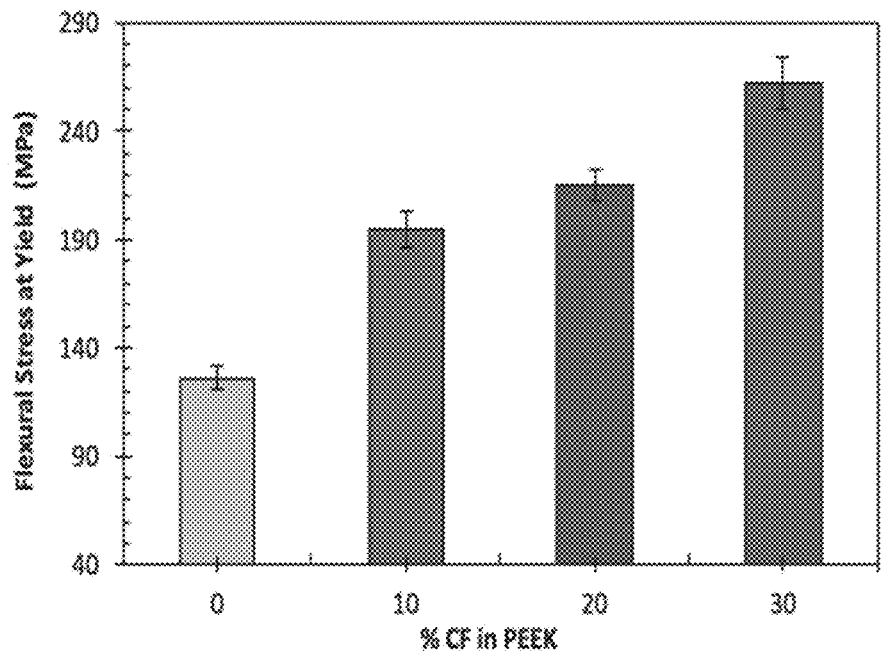
Figure 11D:
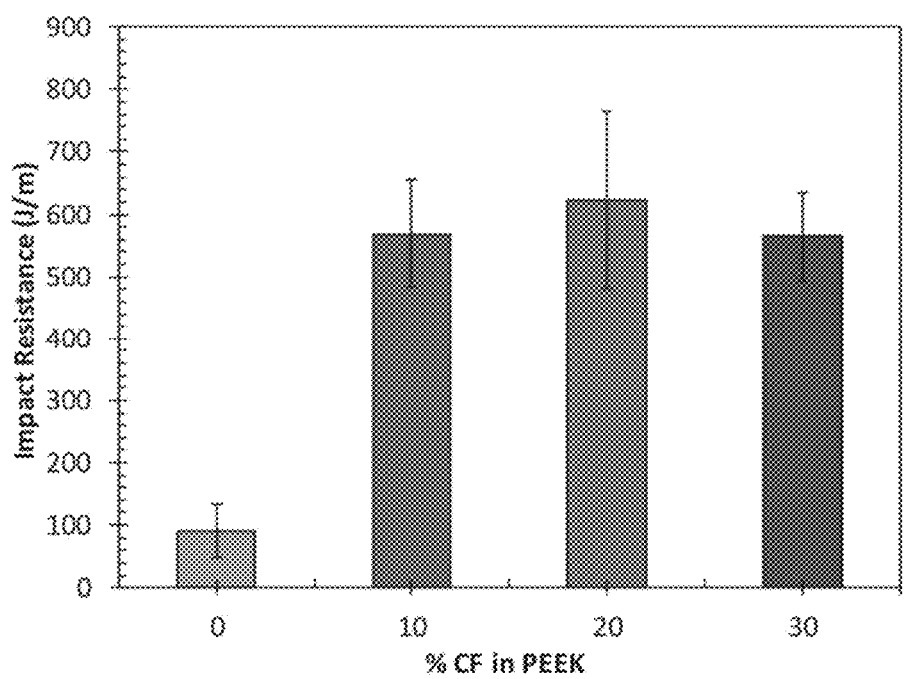

Continuous carbon fiber (CF) was cut to 1 meter lengths and fed directly into the hopper of a high, uniform shear injection molding machine with polyetheretherketone (PEEK) in concentrations of 0, 10, 20, and 30 wt. % CF in PEEK. The CF fractured during high shear melt-processing within molten PEEK in accordance with an embodiment of the method of the present invention. Typically, CF is chopped to lengths ranging from 3 to 10 mm prior to melt-processing. Using the present high shear processing method and continuous CF, there is an opportunity for fiber fracture to occur while the fiber is surrounded by molten polymer, resulting in dangling orbitals on the fiber ends available for covalent bonding with the molten polymer. Primary covalent bonds between CF ends and the polymer provide efficient load transfer, increased mechanical properties and high energy absorption capability. The composite morphology is presented using field emission scanning electron microscopy and indicates very good fiber dispersion and distribution (see FIG. 10). Flexural properties were determined according to ASTM D790 and indicate significant increases in flexural modulus and strength. Izod impact resistance was determined according to ASTM D256 on notched specimens with complete fractures and indicate a significant increase in impact resistance with increasing CF concentration. (See FIGS. 11(a)-(d)). Typically, fiber-reinforced thermoplastic composites suffer from lower impact resistance than the polymer alone. For example, the PEEK manufacturer makes a 30 wt. % CF reinforced PEEK using chopped CF, and they state that the Izod impact resistance decreases from 91 J/m to 69 J/m for PEEK and 30 wt. % chopped CF in PEEK, respectively.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A high strength carbon fiber-reinforced polymer matrix composite comprising cross-linked polymer particles distributed in a non-cross-linked molten host matrix polymer, wherein the cross-linked polymer particles consist essentially of carbon fibers distributed into a carbon-containing polymer phase comprising one or more carbon-containing polymers, wherein the one or more carbon-containing polymers are cross-linked by direct covalent bonds to the ends of the carbon fibers, and wherein the carbon fibers are selected from the group consisting of single-walled carbon nanotubes, multi-walled carbon nanotubes, carbon nanofibers, and micron-sized carbon fibers.

2. The carbon fiber-reinforced polymer matrix composite of claim 1, wherein the polymer in the cross-linked polymer particles or the non-cross-linked molten host matrix polymer is selected from the group consisting of polyetherketones (P.E.K.), Polyetherketoneketone (PEKK), polyphenylene sulfides (P.P.S.), polyethylene sulfide (P.E.S.), polyetherimides (P.E.I.), polyvinylidene fluoride (PVDF), polysulfones (P.S.U.), polycarbonates (P.C.), polyphenylene ethers, aromatic thermoplastic polyesters, aromatic polysulfones, thermoplastic polyimides, liquid crystal polymers, thermoplastic elastomers, polyethylene, polypropylene (P.P.), polystyrene (P.S.), acrylics, ultra-high-molecular-weight polyethylene (UHMWPE), polytetrafluoro-ethylene (PTFE/Teflon®), polyamides (P.A.), polyphenylene oxide (P.P.O.), polyoxy methylene plastic (P.O.M./Acetal), polyarylether-ketones, polyvinylchloride (P.V.C.), and mixtures thereof.

3. The carbon fiber-reinforced polymer matrix composite of claim 1, comprising polymer chains inter-molecularly and directly cross-linked by broken carbon fibers, wherein the polymer to fiber cross-links consist essentially of direct covalent bonds to exposed ends of the broken carbon fibers.

4. The carbon fiber-reinforced polymer matrix composite of claim 3, wherein breaking of carbon fibers occurs through high shear melt processing.

5. The carbon fiber-reinforced polymer matrix composite of claim 1, wherein the composite comprises between about 0.1 and about 30 wt % carbon fibers based on the total composite weight.

6. The carbon fiber-reinforced polymer matrix composite of claim 5, wherein the composite comprises between about 10 and about 30 wt % carbon fibers based on the total composite weight.

7. The carbon fiber-reinforced polymer matrix composite of claim 1, further comprising mechanically exfoliated graphene distributed therein.

8. The carbon fiber-reinforced polymer matrix composite of claim 2, further comprising mechanically exfoliated graphene distributed therein.

9. The carbon fiber-reinforced polymer matrix composite of claim 1, wherein the amount of cross-linked polymer particles distributed in the non-cross-linked molten host matrix polymer is sufficient to provide the composite with improved stiffness and strength as compared to a composite lacking covalent bonding between carbon fibers and polymer.

10. The carbon fiber-reinforced polymer matrix composite of claim 1, wherein the amount of cross-linked polymer particles distributed in a non-cross-linked molten host matrix polymer is sufficient to provide the composite with improved impact energy absorption as compared to a composite lacking covalent bonding between carbon fibers and polymer.

11. A filament for 3D printing formed of the composite of claim 1.

12. A filament for 3D printing formed of the composite of claim 2.

13. An automotive, aircraft or aerospace part formed from the composite of claim 1.

14. The part of claim 13, wherein the part is an engine part.

15. The carbon fiber-reinforced polymer matrix composite of claim 1, further comprising mechanically exfoliated graphene distributed therein.

* * * * *